United States Patent Office 2,877,248
Patented Mar. 10, 1959

2,877,248

ALUMINUM COMPOUNDS SOLUBLE IN ORGANIC SOLVENTS AND PROCESS OF PREPARING THEM

Martin Reuter, Ludwig Orthner, and Rudolf Reuber, Frankfurt am Main, Germany, assignors to Farbwerke Hoechst Aktiengesellschaft vormals Meister Lucius & Brüning, Frankfurt am Main, Germany, a company of Germany No Drawing. Application December 16, 1953
Serial No. 398,642

Claims priority, application Germany December 18, 1952

9 Claims. (Cl. 260—414)

It is known that aluminum glycolate cannot be obtained by the direct action of glycol upon amalgamated aluminum but that aluminum alcoholates of glycol and trimethylene glycol of unknown constitution are formed when glycol or trimethylene glycol acts upon aluminum alcoholate in the heat which displacing the alcohol (cf. Tischtschenko, Journ. russ. physikal. chem. Ges. 31 (1899), pages 769–770). However, the compounds thus obtained are insoluble in organic solvents and therefore unsuitable for such technical purposes which require solubility in organic substances (for instance as addition to lubricants).

Now we have found that aluminum compounds soluble in organic solvents can be prepared by reacting aluminum or aluminum alcoholates of low aliphatic monohydric alcohols, if desired only partly, with aliphatic glycols containing 4–18 carbon atoms, which contain at least one secondary hydroxyl group unless the carbon chain is interrupted by oxygen atoms, and, if necessary, by reacting these aluminum compounds with up to 2 mols of carboxylic acid and/or sulfinic acid. In addition, the reaction products may be stabilized against decomposition by moisture by means of volatile organic substances capable of forming complex compounds.

Most likely, the reaction of the said glycols with aluminum according to the process of the present invention furnishes aluminum glycolates having the following constitution:

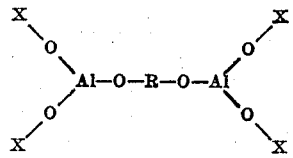

in which R represents the carbon chain of glycol.

When reacting the said glycols with aluminum alcoholates of low aliphatic monohydric alcohols, the monohydric alcohol is displaced in stages according to the molar ratio applied, the lowest stage having the following constitution:

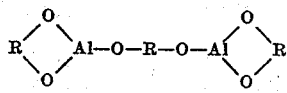

In this formula A represents the carbon chain of the monohydric alcohol. The solubility of these new aluminum compounds can most likely be traced back to constitutional as well as to stearic conditions in the glycols used. It appears that hereby on the one hand the formation of insoluble cross-linked aluminum compounds is prevented whereas on the other hand the solubility is especially promoted by terminal methyl groups. By further reaction with up to 2 mols of carboxylic acid or sulfinic acid, glycols or glycols and alcohols are displaced in stages from the said aluminum compounds by the acid radical, so that the use of 2 mols of acid per 1 gram atom of aluminum in formula I leads to a partial aluminum salt of the following constitution

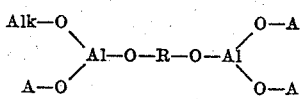

in which X represents the acid radical.

The reaction of the glycols of the above constitution with aluminum or with aluminum alcoholates or low monohydric aliphatic alcohols is carried out in the manner known for preparing aluminum alcoholates by heating the components at about 80° C.–200° C. in the presence or absence of inert solvents such as aromatic or aliphatic hydrocarbons having a high boiling point, for instance, benzene, toluene, xylene, ligroin or chlorinated aromatic hydrocarbons such as chlorobenzene. Regarding the reaction with aluminum, it is of advantage to add in small quantities the activating agents known for the preparation of aluminum alcoholates, for instance, halogens such as iodine, or metal halides such as mercuric chloride, aluminum chloride, or halogen hydracids such as hydrochloric acid and the like. Amalgamated aluminum may also be used for the reaction. In case aluminum alcoholates are used, the displaced monohydric alcohol and, if desired, the solvent used, are distilled off during or after the addition of the glycols.

The aluminum glycolates thus formed, which may also contain alkoxy groups, are solid colourless substances being soluble in aliphatic and aromatic hydrocarbons used as benzine, benzene, xylene, furthermore in chlorinated hydrocarbons, such as carbon tetrachloride, chlorobenzene, in ethers, such as diethyl ether, or in aliphatic alcohols, such as ethanol. They may advantageously be reacted with up to 2 mols of carboxylic or sulfinic acids. The reaction is carried out in the presence or absence of inert solvents at the ordinary or a raised temperature of about 50° C.–150° C., if desired, also in stages.

The partial aluminum salts formed are, according to the acid used, of semi-solid to solid or of resin-like consistency with the solubility properties of the aluminum glycolates used.

As aliphatic glycols of the claimed constitution are suitable, for instance, glycols with 4–18 carbon atoms containing one or two secondary hydroxyl groups, for instance 1:3-butylene glycol, 2-ethyl-hexandiol-(1:3), 2:4-hexandiol, 2:5 - hexandiol, 2 - methyl - pentandiol-(2:4), 2:9-dimethyl-decandiol-(3:8), or 1:12-octadecandiol. In addition, there may be used glycols, the carbon chain of which is interrupted by oxygen atoms, for instance polyethylene glycols and alkyl derivatives thereof, such as diglycol $CH_2(OH)$—$CH_2O$—$CH_2$—$CH_2(OH)$, 1-methyl-diglycol, 1:4-dimethyl-diglycol, 1:6-dimethyl-triglycol, or 1:4:6-trimethyl-triglycol. There may also be used mixtures of glycols.

As starting materials there may be mentioned, in addition to aluminum, aluminum alcoholates, for instance ethylate, isopropylate, butylate, 2-ethyl-butanolate and the like. As carboxylic acid there may be mentioned aliphatic carboxylic acids, such as formic acid, acetic acid, propionic acid; alicyclic carboxylic acids, such as cyclohexane carboxylic acid, aromatic carboxylic acids, such as benzoic acid, salicylic acid, or naphthoic acid. As sulfinic acids there are suitable, for instance, ethane sulfinic acid, cyclohexane sulfinic acid, benzene sulfinic acid. Especially suitable are, for instance, carboxylic and sulfinic acids of high molecular weight, such as lauric acid, palmitic acid, stearic acid, or oleic acid, furthermore sulfinic acids which are obtained in known manner from sulfochlorides of natural and synthetic Diesel oils or mixtures of acids such as sperm oil fatty acid, naphthenic acids or resin acids.

The aluminum glycolates or acid aluminum glycolates obtained according to the invention may be used as intermediate products, as agents having a water-repellent effect (in inert organic solvents) on fibrous materials, if desired with addition of hydrophobic organic substances, and also as admixtures for coatings and lubricants. According to their constitution, the reaction products are more or less decomposable by moisture. In the manner known for aluminum alcoholates, they can be stabilized to a great extent, especially at the ordinary temperature, against decomposition by moisture by means of volatile organic substances capable of forming complex compounds. As volatile organic substances capable of forming complex compounds there come, for example, into consideration compounds containing a weakly acid group, for instance aliphatic hydroxy-carboxylic acid esters, for instance tartaric acid diethyl ester, or oximes such as acetone oxime, or acetaldehyde oxime, furthermore compounds containing a group capable of desmotropic re-arrangement into the aciform such as acetyl-acetone, acetoacetic ester, nitromethane, nitropropane, malonic acid dinitrile, and the like. There come also into consideration compounds containing a reactive methylene group such as malonic acid ester, and also hydroxy-oxo-compounds such as butyroin or aliphatic nitriles such as acetonitrile.

The following examples serve to illustrate the invention, but they are not intended to limit it thereto, the parts being by weight:

Example 1

135 parts of xylene and 10 parts of aluminum powder are heated to boiling and there are then added 0.2 part of iodine, 0.2 part of mercuric chloride, and 1.5 parts of aluminum chloride. In the course of 2 hours there are added dropwise, while stirring, 65 parts of 2.5 hexandiol, while the reaction mixture is boiling constantly under reflux and the hydrogen formed escapes through the reflux condenser. A solution of aluminum-2.5-hexandiolate in xylene is formed which is freed from small remains of non-reacted aluminum by filtration. After the xylene has been distilled off, aluminum-2:5-hexandiolate solidifies in the cold to a white and hard mass melting at 160° C. which is soluble in benzene, xylene, and carbon tetrachloride. Analysis showed 12.2 percent of aluminum whereas 13.4 percent of aluminum are calculated from $Al_2(C_6H_{12}O_2)_3$.

The structural configuration for the resulting product corresponding to the formula $Al_2(C_6H_{12}O_2)_3$ is as follows:

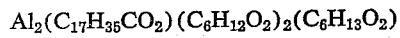
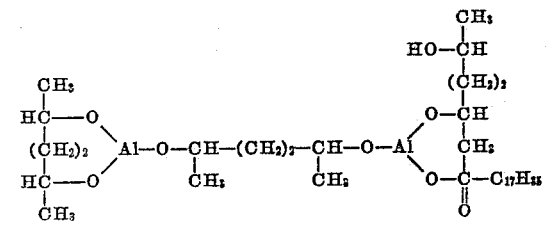

If 2:5-hexandiol is replaced by 80 parts of 2-ethyl-hexandiol-(1:3) and otherwise the same method of working is adopted as described above, aluminum-2-ethyl-hexandiolate is obtained which is also readily soluble in xylene.

Example 2

20 parts of aluminum isopropylate are dissolved in 100 parts of xylene and to the solution boiling under reflux there are added, while stirring, 18 parts of 2:5-hexandiol in the course of one hour. The reflux condenser is heated to about 90° C. so that the isopropanol split off can be distilled off, thus being recovered in an almost theoretical quantity. A clear solution of aluminum-2:5-hexandiolate in xylene is obtained which, after distilling off the xylene, yields the same compound as in Example 1.

Example 3

40 parts of aluminum-2:5-hexandiolate prepared as described in Example 1 or 2 are dissolved in 100 parts of benzene and 27 parts of stearin are added at 60° C., while stirring. A clear syrupy solution of the condensation product of monostearic acid and aluminum-2:5-hexandiolate of the formula $$Al_2(C_{17}H_{35}CO_2)(C_6H_{12}O_2)_2(C_6H_{13}O_2)$$

is obtained. From this solution there is obtained, by distilling off the solvent and the displaced 2:5-hexandiol under reduced pressure at 100° C., the reaction product in the form of a yellowish oil which solidifies in the cold to show a wax-like consistency and which is soluble in xylene, benzene, carbon tetrachloride, and heavy benzine. The structural configuration of the resulting product corresponding to the above formula is as follows:

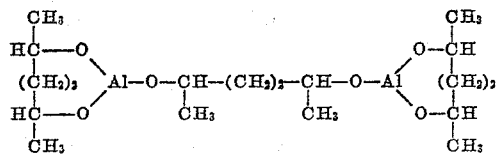

Example 4

204 parts of aluminum isopropylate are dissolved in 500 parts of xylene and to the solution boiling under reflux there are added in the course of 2 hours, while stirring, 53 parts of diglycol. The reflux condenser is heated to 90° C., so that the isopropanol split off can be distilled off for the purpose of recovery. A clear solution of a mixed aluminum alcoholate of the formula $Al_2(C_3H_7O)_4(C_4H_8O_3)$ in xylene is obtained. After distilling off the solvent under reduced pressure, a viscous oil is obtained which solidifies to a colourless wax-like mass, and which is readily soluble in xylene, benzene, and carbon tetrachloride. By addition of 0.3 mol of acetoacetic ester the xylene solution can be stabilized against decomposition by moisture.

Example 5

330 parts of aluminum 2-ethyl-butanolate are dissolved in 1000 parts of xylene and boiled with 45 parts of 1:3-butylene glycol for 2 hours under reflux. From the clear solution so obtained of the mixed aluminum alcoholate of the formula $Al_2(C_4H_8O_2)(C_6H_{13}O)_4$ the solvent is distilled off under reduced pressure. A viscous oil is obtained in this way which solidifies to a wax-like mass and which is soluble in xylene, benzene, and carbon tetrachloride.

Example 6

204 parts of aluminum isopropylate are dissolved in 500 parts of xylene; 143 parts of 1:12-octadecandiol are added, and the mixture is heated for 1 hour under reflux. The reflux condenser is hereby heated to 90° C., so that the isopropanol split off can be distilled off for the purpose of recovery. There is obtained a clear solution of a mixed aluminum alcoholate of the formula $Al_2(C_3H_7O)_4(C_{18}H_{36}O_2)$ in xylene. After the solvent has been distilled off under reduced pressure, the above compound is obtained in the form of a white solid substance which is soluble in xylene, test benzine, and perchlorethylene.

If, instead of 1:12-octadecandiol, 101 parts of 2:9-dimethyl-decandiol-(3:8) are used and otherwise the same method of working is adopted as described above, a mixed aluminum alcoholate of the formula $$Al_2(C_3H_7O)_4(C_{12}H_{24}O_2)$$

is obtained in the form of a white solid substance which is also soluble in xylene, test benzine, and perchlorethylene.

Example 7

To the xylene solution of 1 mol of the mixed aluminum alcoholate of the formula

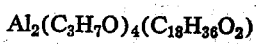

prepared according to the process of Example 6, there is added 1 mol of commercial stearic acid. The mixture is heated to 40° C. while stirring. While 1 mol of isopropanol is split off, a viscous solution of a condensation product of stearic acid, aluminum isopropylate and octadecandiolate of the formula

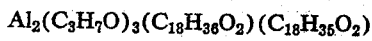

is formed which is, for instance used for hydrophobizing fibrous materials in inert organic solvents, for instance carbon tetrachloride, advantageously with addition of hydrophobic organic substances, such as paraffin wax.

Example 8

An impregnating agent of lardy consistency suitable for hydrophobizing fibrous materials in organic solvents, which is especially suitable subsequent to dry cleaning, can be obtained as follows:

3000 parts of aluminum-2:5-hexandiolate prepared as described in Example 1 or 2 are dissolved in the heat, while stirring, in 3000 parts of xylene and 10000 parts of perchlorethylene. 1200 parts of acetoacetic ester are then added and, at about 90° C., there are introduced 2700 parts of stearic acid (solidification point 52° C.) as well as 9000 parts of paraffin wax (solidification point 60/62° C.). On cooling, the syrupy mass solidifies to show a wax-like consistency.

The lardy product is dissolved in 10 times its weight of heavy gasoline or in 20 times its weight of carbon tetrachloride. In this liquor dry cleaned outer garments made of vegetable, animal or synthetic fibrous materials, such as cotton, wool, acetate rayon, polyamide fibres, polyester fibres or viscose fibers, are impregnated for about 15 minutes at room temperature in a machine of the kind used for dry cleaning. Subsequently the excess of the impregnating liquor is discharged, the impregnated material is centrifuged in the machine, and the solvent is distilled off by blowing in hot air. The material is then finished by ironing. The material treated in this way shows an excellent water droplet repellent effect.

By the same procedure but using, instead of stearic acid, the same quantity of commercial sperm oil fatty acid (acid number=211, saponification number=214, iodine number=71) or 1220 parts of benzoic acid or 1500 parts of hydrogenated castor oil fatty acid or 1000 parts of 2:3-hydroxynaphthoic cid or a mixture of 300 parts of glacial acetic acid and 1000 parts of lauric acid or a mixture of 700 parts of benzene sulfinic acid and 1350 parts of stearic acid, equally good results are obtained. The acetoacetic ester may wholly or partly be replaced by acetylacetone. Instead of paraffin wax having a solidification point of 60/62° C., there may also be used a paraffin wax having a solidification point of 50/52° C. or a mixture 1:1 of paraffin wax with paraffin slack wax (dropping point 35° C.). If half of the paraffin is replaced by chlorinated paraffin (chlorine content: 40 percent), there are obtained materials having remarkable flameproof properties.

The same impregnating liquor may be used for rendering piece goods consisting of the same kinds of fibres water-repellent by impregnation on the padding machine.

We claim:

1. The process for producing aluminum compounds soluble in organic solvents which consists in at least partly reacting at a temperature of from about 80° C. to 200° C. a compound selected from the group consisting of aluminum and aluminum alcoholates of low molecular aliphatic monohydric alcohols with a member selected from the group consisting of aliphatic glycols containing 4–18 carbon atoms, which contain at least one secondary hydroxyl group and aliphatic glycols containing 4–18 carbon atoms, the carbon chain of which is interrupted by oxygen atoms, and reacting the resulting aluminum compounds at a temperature of from about 40° C. to 150° C. with up to 2 mols of a carboxylic acid containing up to 18 carbon atoms selected from the group consisting of non-substituted aliphatic carboxylic acids, aliphatic carboxylic acids substituted by a hydroxyl group, non-substituted aromatic carboxylic acids and aromatic carboxylic acids substituted by a hydroxyl group.

2. A process for producing aluminum compounds soluble in organic solvents which consists in at least partly reacting at a temperature of from about 80° C. to 200° C. a compound selected from the group consisting of aluminum and aluminum alcoholates of low molecular aliphatic monohydric alcohols, with a member selected from the group consisting of aliphatic glycols containing 4–18 carbon atoms, which contain at least one secondary hydroxyl group and aliphatic glycols containing 4–18 carbon atoms, the carbon chain of which is interrupted by oxygen atoms, and reacting the resulting aluminum compounds at a temperature of from about 40° C. to 150° C. with up to 2 mols of stearic acid.

3. The process as claimed in claim 1, wherein the resulting aluminum compounds are stabilized by a volatile aliphatic compound containing a group capable of desmotropic re-arrangement into the aci-form which is capable of forming complex compounds selected from the group consisting of carboxylic acid esters and ketones.

4. The process as claimed in claim 1, wherein the resulting aluminum compounds are stabilized with acetoacetic acid esters.

5. The process as claimed in claim 1, wherein the resulting aluminum compounds are stabilized with acetylacetone.

6. A compound selected from the group consisting of

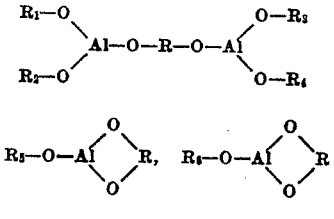

and stabilized complexes thereof with a volatile organic compound selected from the group consisting of acetoacetic acid ester and acetyl acetone capable of forming complexes with aluminum alcoholates wherein R represents an aliphatic glycol radical containing 4–18 carbon atoms and selected from the group consisting of glycols having a secondary hydroxyl group and glycols wherein the carbon chain is interrupted by oxygen atoms, wherein $R_6$ is the acid radical of stearic acid, $R_1$, $R_2$, $R_3$, $R_4$ and $R_5$ are selected from the group consisting of alkyl radicals containing up to about 6 carbon atoms, and wherein $R_1$ together with $R_2$ and $R_3$ together with $R_4$ can further represent a glycol radical as defined for R.

7. As a new compound $Al_2(sec-C_6H_{12}O_2)_3$ having the formula

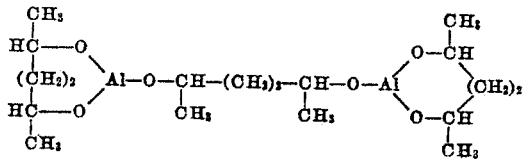

8. As a new compound

having the formula

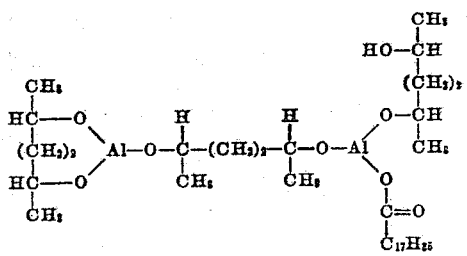

9. As a new compound, the complex with acetoacetic acid ester of $Al_2(C_{17}H_{35}CO_2)(C_6H_{12}O_2)_2(C_6H_{13}O_2)$.

References Cited in the file of this patent

UNITED STATES PATENTS

| | | |
|---|---|---|
| 1,870,859 | Maximoff | Aug. 9, 1932 |
| 2,229,528 | Shoemaker | Jan. 21, 1941 |
| 2,579,251 | Coates | Dec. 18, 1951 |

FOREIGN PATENTS

| | | |
|---|---|---|
| 261,377 | Great Britain | Feb. 10, 1927 |

OTHER REFERENCES

Adkins et al.: Journal American Chem. Soc. 60, 1151 (1938).

Gray et al.: Jour. of Physical and Colloid Chem. vol. 53, p. 23 et seq. (1949).

Sidgwick: Chemical Elements and Their Compounds, Oxford Univ. Press, 1951, London, vol. I, p. 422.

Mehrotra: Journ. Indian Chem. Soc., vol. 30, No. 9, 1953; received Feb. 19, 1953.

Tischtschenko, Chem. Centralblatt, 1900, I, p. 10.